US010318605B2

(12) United States Patent
Shu et al.

(10) Patent No.: US 10,318,605 B2
(45) Date of Patent: Jun. 11, 2019

(54) METHOD AND DEVICE FOR RELOCATING INPUT BOX TO TARGET POSITION IN MOBILE TERMINAL BROWSER, STORAGE MEDIUM

(71) Applicant: Tencent Technology (Shenzhen) Company Limited, Guangdong (CN)

(72) Inventors: Yuqiang Shu, Guangdong (CN); Libin Ren, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 882 days.

(21) Appl. No.: 14/323,193

(22) Filed: Jul. 3, 2014

(65) Prior Publication Data

US 2015/0007018 A1    Jan. 1, 2015

Related U.S. Application Data

(63) Continuation of application No. PCT/CN2013/088677, filed on Dec. 5, 2013.

(30) Foreign Application Priority Data

Apr. 3, 2013   (CN) .......................... 2013 1 0116029

(51) Int. Cl.
*G06F 16/958* (2019.01)
*G06F 3/0481* (2013.01)
(Continued)

(52) U.S. Cl.
CPC .......... *G06F 16/972* (2019.01); *G06F 3/0481* (2013.01); *G06F 3/0485* (2013.01); *G06F 16/9577* (2019.01)

(58) Field of Classification Search
CPC .. G06F 3/0485; G06F 16/972; G06F 16/9577; G06F 3/0481
See application file for complete search history.

(56) References Cited

U.S. PATENT DOCUMENTS 8,607,156 B1 * 12/2013 Jania .................... G06F 3/04855
715/786
2002/0085038 A1 * 7/2002 Cobbley ............... G06F 3/0481
715/773
(Continued)

FOREIGN PATENT DOCUMENTS

CN    1206887 A    2/1999
CN    102541411 A    7/2012
(Continued)

OTHER PUBLICATIONS

International Search Report, PCT/CN2013088677, Tencent Technology (Shenzhen) Company Limited, dated Mar. 13, 2014.
(Continued)

*Primary Examiner* — Cesar B Paula
*Assistant Examiner* — Konrad J Kulikowski
(74) *Attorney, Agent, or Firm* — Anova Law Group, PLLC

(57) ABSTRACT

A method for relocating an input box to a target position in a mobile terminal browser comprises: when a user clicks an input box in a browsed web page and an input method interface pops up, calculating a position of the input box relative to the input method interface and determining whether the input box is partially or completely covered by the input method interface; designating a target position of the input box according to a position of the input method interface, when the input box is partially or completely covered by the input method interface; and rendering the input box at the target position by scrolling the browsed web page and/or canvas. By the invention, when a user clicks an
(Continued)

input box and an input method interface pops up, the input box can be relocated and displayed at a reasonable position and be completely visible to the user.

15 Claims, 5 Drawing Sheets

(51) Int. Cl.
*G06F 3/0485* (2013.01)
*G06F 16/957* (2019.01)

(56) References Cited

U.S. PATENT DOCUMENTS

2006/0033724 A1* 2/2006 Chaudhri ............... G06F 3/0482
 345/173
2012/0084663 A1* 4/2012 Momchilov .......... G06F 3/0481
 715/744

FOREIGN PATENT DOCUMENTS

CN 102945137 A 2/2013
JP 2009237836 A 10/2009

OTHER PUBLICATIONS

Patent Abstract of CN101853136, Virtual Keyboard and Dynamic Adjustment Method Thereof and Electronic Device, Shanghai Hehe Information Sci & Tech Inc., Oct. 6, 2010.
Patent Abstract of CN102063255, Input Method for Touch Screen, Touch Screen and Device, Baidu On Line Network Tech BJ, May 18, 2011.
Patent Abstract of CN102981699, Adjusting Content to Avoid Occlusion by a Virtual Input Panel, Microsoft Corp., Mar. 20, 2013.
The State Intellectual Property Office of the People's Republic of China (SIPO) Office Action 1 for 201310116029.1 dated Feb. 28, 2015 6 Pages (including translation).

* cited by examiner

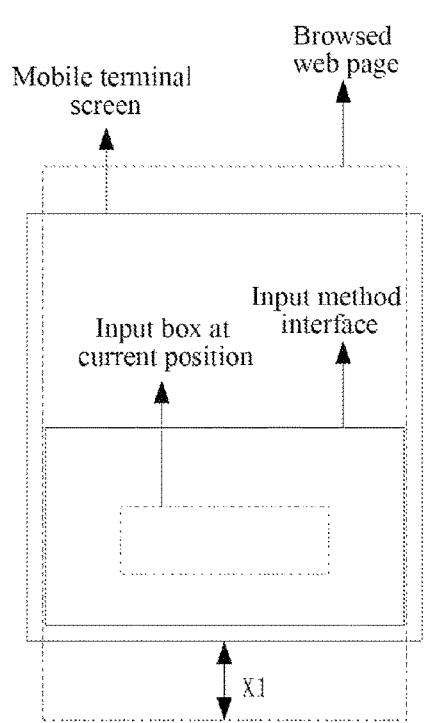
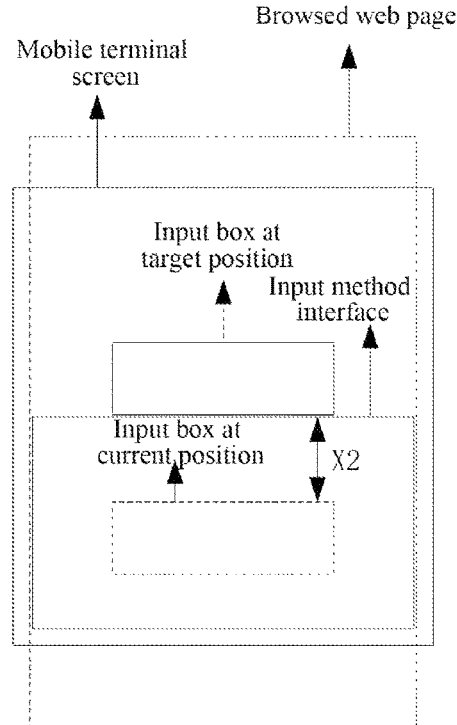

FIG.5A  FIG.5B

When an input box is clicked and an input method interface pops up from the upper end of a mobile terminal screen, determining whether the input box is partially or completely covered by the input method interface — S601

Determining the target position of the input box according to the lower edge position of the input method interface, when the input box is partially or completely covered by the input method interface — S602

Rendering the input box at the target position by scrolling the browsed web page and/or canvas — S603

FIG.6

METHOD AND DEVICE FOR RELOCATING INPUT BOX TO TARGET POSITION IN MOBILE TERMINAL BROWSER, STORAGE MEDIUM

CROSS-REFERENCE TO RELATED APPLICATIONS

This application is a continuation application of PCT Patent Application No. PCT/CN2013/088677, entitled "METHOD AND DEVICE FOR RELOCATING INPUT BOX TO TARGET POSITION IN MOBILE TERMINAL BROWSER, AND STORAGE MEDIUM" filed on Dec. 5, 2013, which claims priority to Chinese Patent Application No. 201310116029.1, entitled "METHOD AND DEVICE FOR RELOCATING INPUT BOX TO TARGET POSITION IN MOBILE TERMINAL BROWSER" filed on Apr. 3, 2013, both of which are incorporated by reference in their entirety.

FIELD

This disclosure relates to the field of mobile communication technologies, and in particular, to a method and a device for relocating an input box to a target position in a mobile terminal browser, and a storage medium.

BACKGROUND

In recent years, with the rapid development of mobile communication technologies, various hand-held terminal devices such as mobile phones and Personal Digital Assistants (PDAs) have become indispensable electronic devices in daily life. When a web page is browsed using a browser on a hand-held terminal device, an input box is usually displayed in the web page to receive information input by a user. When the user clicks a certain input box in the web page, an input method interface usually pops up from the bottom of the screen of the hand-held terminal device to allow the user to input information as required by the input box. If the position of the input box displayed on the web page as browsed, i.e., the current position of the input box, is on the lower part of the screen of the hand-held terminal device, the input box may be covered by the popped up input method interface in the browser, resulting in that the user cannot review the information inputted in the input box. Therefore, it is necessary to relocate the input box to a reasonable target position, so that the input box is visible to the user when the input method interface pops up.

In an existing method based on a system browser, after an input box is clicked at its current position, a control such as an input method interface like a soft keyboard is created at the position of the input box, and this method is mainly applicable to a system self-drawn input method. However, if the current position of the input box is at the bottom of the screen of the hand-held terminal device, the input box still cannot be displayed in a visible region, thus interfering with the inputting by the user; moreover, this method does not support the attribute of CONTENTEDITABLE in Hyper Text Mark-up Language (HTML).

In order to solve the above problem, a method for designating a target position of an input box based on an estimated value has been put forward in the prior art, where, when an input method interface pops up from the bottom of the screen, it is roughly determined whether the input method interface will cover the input box by determining the position of a cursor of the input box at the current position in the screen of the hand-held terminal device; and if so, the web page as browsed is moved upward by a preset distance, so that the input box is visible to the user.

This method solves the problem of the above method based on the system browser, and is mainly applicable to a self-drawn input method. However, there still exist the following disadvantages that: in this method, an approximate position of the input box in the screen is estimated, and then the web page as browsed is moved accordingly, that is, if the current position of the input box is at the bottom of the screen of the hand-held terminal device, a blank region exists below the designated target position of the input box due to the upward movement of the web page as browsed, as a result, user experience will be severely degraded; this method cannot be well adapted to screens with various resolutions; moreover, if a verification code exists above the current position of the input box, this method may cause the verification code to be beyond the screen and invisible after the input box is relocated. As a result, in fact, it is difficult to give a reasonable target position of the input box so that the verification code is visible to the user.

SUMMARY

Therefore, embodiments of the invention provide a method and a device for relocating an input box to a target position in a mobile terminal browser, and a storage medium, thereby accurately relocating an input box to a suitable position.

On one hand, an embodiment of the invention provides a method for relocating an input box to a target position in a mobile terminal browser, including:

Step S1: calculating, when an input box in a browsed web page is clicked and an input method interface pops up, a position of the input box relative to the input method interface and determining whether the input box is partially or completely covered by the input method interface;

Step S2: designating a target position of the input box according to a position of the input method interface, when the input box is partially or completely covered by the input method interface; and Step S3: rendering the input box at the target position by scrolling the browsed web page and/or canvas.

Further, the Step S1 includes:

determining whether a lower edge position of the input box is below an upper edge position of the input method interface, when the input box is clicked and the input method interface pops up from the bottom of a mobile terminal screen; and if the lower edge position of the input box is below the upper edge position of the input method interface, determining that the input box is partially or completely covered by the input method interface.

Further, the Step S2 includes:

designating the target position of the input box in such a way that the lower edge position of the input box coincides with the upper edge position of the input method interface, when the input box is partially or completely covered by the input method interface.

Further, the Step S3 includes:

calculating a distance between the lower edge position of the browsed web page and the lower edge position of the mobile terminal screen as a first distance;

calculating a distance between the lower edge position of the input box at the target position and the lower edge position of the input box at the current position as a second distance; and rendering the input box at the target position by scrolling the browsed web page and/or canvas according to the first distance and the second distance.

Further, rendering the input box at the target position by scrolling the browsed web page and/or canvas according to the first distance and the second distance includes:

scrolling the browsed canvas upward by the second distance when the first distance is 0, so that the input box is relocated at the target position;

scrolling the browsed web page upward by the second distance when the first distance is larger than or equal to the second distance, so that the input box is relocated at the target position; and calculating a difference between the second distance and the first distance as a third distance when the first distance is less than the second distance, scrolling the browsed web page upward by the first distance, and then scrolling the browsed canvas upward by the third distance, so that the input box is relocated at the target position.

Or, the Step S1 may include:

determining whether the upper edge position of the input box is above the lower edge position of the input method interface when the input box is clicked and the input method interface pops up from the top of the mobile terminal screen; and if so, determining that the input box is partially or completely covered by the input method interface.

Correspondingly, the Step S2 may include:

designating the target position of the input box in such a way that the upper edge position of the input box coincides with the lower edge position of the input method interface, when the input box is partially or completely covered by the input method interface.

Correspondingly, the Step S3 may include:

calculating a distance between the upper edge position of the browsed web page and the upper edge position of the mobile terminal screen as a fourth distance;

calculating a distance between the lower edge position of the input box at the target position and the lower edge position of the input box at the current position as a fifth distance; and rendering the input box at the target position by scrolling the browsed web page and/or canvas according to the fourth distance and the fifth distance.

Further, rendering the input box at the target position by scrolling the browsed web page and/or canvas according to the fourth distance and the fifth distance includes:

scrolling the canvas browsed downward by the fifth distance when the fourth distance is 0, so that the input box is relocated at the target position;

scrolling the browsed web page downward by the fifth distance when the fourth distance is larger than or equal to the fifth distance, so that the input box is relocated at the target position; and calculating a difference between the fifth distance and the fourth distance as a six distance when the fourth distance is less than the fifth distance, scrolling the browsed web page downward by the fourth distance, and then scrolling the browsed canvas downward by the six distance, so that the input box is relocated at the target position.

On the other hand, an embodiment of the invention provides a device for determining a target position of an input box in a mobile terminal browser including:

a determining module, which is used for calculating, when an input box in a browsed web page is clicked and an input method interface pops up, a position of the input box relative to the input method interface and determining whether the input box is partially or completely covered by the input method interface;

a locating module, which is used for designating a target position of the input box according to a position of the input method interface, when the input box is partially or completely covered by the input method interface; and a rendering module, which is used for rendering the input box at the target position by scrolling the browsed web page and/or canvas.

Further, the determining module is specifically adapted to:

determine whether the lower edge position of the input box is below the upper edge position of the input method interface, when the input box is clicked and the input method interface pops up from the bottom of a mobile terminal screen; and if so, determine that the input box is partially or completely covered by the input method interface.

Further, the locating module is specifically adapted to:

designate the target position of the input box in such a way that the lower edge position of the input box coincides with the upper edge position of the input method interface, when the input box is partially or completely covered by the input method interface.

Further, the rendering module comprises:

a first calculating submodule, which is used for calculating a distance between the lower edge position of the browsed web page and the lower edge position of the mobile terminal screen as a first distance;

a second calculating submodule, which is used for calculating a distance between the lower edge position of the input box at the target position and the lower edge position of the input box at the current position as a second distance; and a first scrolling and rendering submodule, which is used for rendering the input box at the target position by scrolling the browsed web page and/or canvas according to the first distance and the second distance.

Or, the determining module is specifically adapted to:

determine whether the upper edge position of the input box is above the lower edge position of the input method interface, when the input box is clicked and the input method interface pops up from the top of the mobile terminal screen; and if so, determine that the input box is partially or completely covered by the input method interface.

Correspondingly, the locating module is specifically adapted to:

designating the target position of the input box in such a way that the upper edge position of the input box coincides with the lower edge position of the input method interface, when the input box is partially or completely covered by the input method interface.

Correspondingly, the rendering module includes:

a third calculating submodule, which is used for calculating a distance between the upper edge position of the browsed web page and the upper edge position of the mobile terminal screen as a fourth distance;

a fourth calculating submodule, which is used for calculating a distance between the lower edge position of the input box at the target position and the lower edge position of the input box at the current position as a fifth distance; and a second scrolling and rendering submodule, which is used for rendering the input box at the target position by scrolling the browsed web page and/or canvas according to the fourth distance and the fifth distance.

On yet another hand, an embodiment of the invention further provides a storage medium containing computer-executable instructions, which, when executed by a computer processor, perform a method for determining a target position of an input box in a mobile terminal browser, wherein the method includes:

calculating, when an input box in a browsed web page is clicked and an input method interface pops up, a position of the input box relative to the input method interface and determining whether the input box is partially or completely covered by the input method interface;

designating a target position of the input box according to a position of the input method interface, when the input box is partially or completely covered by the input method interface; and rendering the input box at the target position by scrolling the browsed web page and/or canvas.

In the technical solution according to the invention is advantageous in comparison with the prior art in that, when the input box is partially or completely covered by the input method interface, the browsed web page and/or canvas is scrolled, so that the input box is finally rendered at a reasonable target position for display and is completely visible to the user, to avoid the case that, when the input method interface pops up from the bottom of a mobile terminal screen, a blank region will sometimes appear under the target position of the input box. Moreover, the user will not be disturbed from viewing a verification code above the input box.

BRIEF DESCRIPTION OF THE DRAWINGS

In order to more clearly illustrate the technical solutions in the embodiments of the invention, the figures used for the description of the embodiments will be briefly introduced below. However, these figures used for the description below illustrate only some embodiments of the invention, and further modifications and substitutions may be made on these figures by one of ordinary skills in the art without creative work.

FIG. 5A is a schematic diagram showing the calculating of the first distance according to the second embodiment of the invention;

FIG. 5B is a schematic diagram showing the calculating of the second distance according to the second embodiment of the invention;

FIG. 6 is a schematic flow chart of a method for relocating an input box to a target position in a mobile terminal browser according to a third embodiment of the invention;

DETAILED DESCRIPTION OF THE EMBODIMENTS

Figure 1:
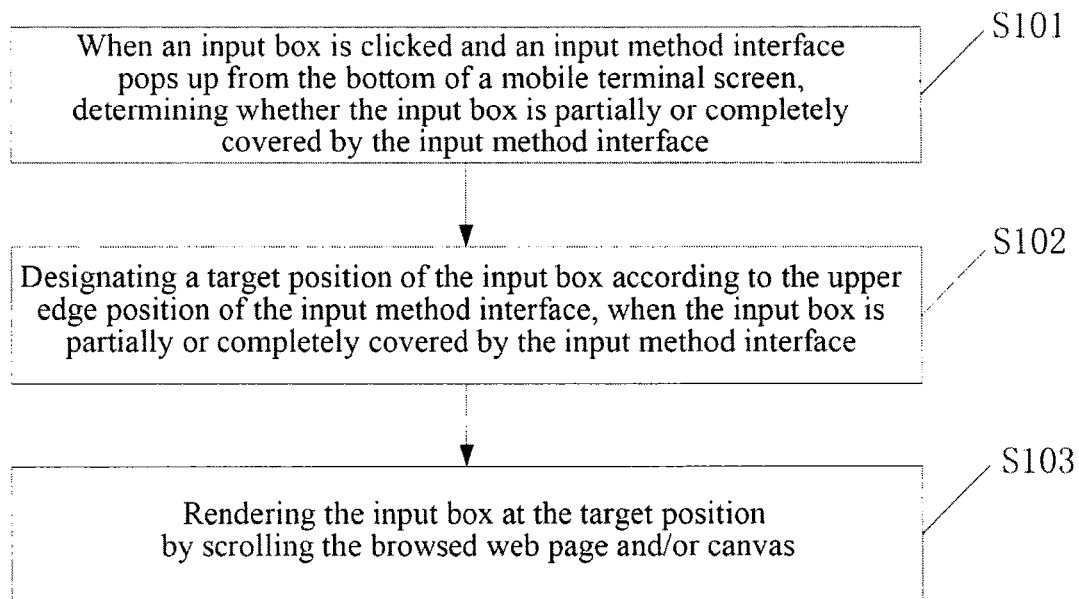
FIG. 1 is a schematic flow chart of a method for relocating an input box to a target position in a mobile terminal browser according to a first embodiment of the invention.

The invention will be further illustrated in detail below in conjunction with the drawings and embodiments. It may be understood that, the specific embodiments described herein are only used to explain the invention, rather than limiting the scope of the invention. Additionally, it may be further noted that, only the parts related to the invention rather than all the disclosures are shown in the drawings, for the sake of easy description.

The method for relocating an input box to a target position in a mobile terminal browser according to an embodiment of the invention specifically includes steps of:

when an input box in a browsed web page is clicked and an input method interface pops up, calculating the position of the input box relative to the input method interface and determining whether the input box is partially or completely covered by the input method interface;

designating a target position of the input box according to the position of the input method interface, when it is determined that the input box is partially or completely covered by the input method interface; and rendering the input box at the target position by scrolling the browsed web page and/or canvas.

In the technical solution of the embodiment of the invention, the position of the input box relative to the input method interface is calculated to precisely acknowledge the practical overlapping between the input box and the input method interface, if any, thereby the target position of the input box can be designated precisely according to the position of the input method interface, and hence the position of the input box can be adjusted accurately, so that the input box may be well displayed in the browsed web page. The technical solution according to the embodiment of the invention can be used to more precisely control the position relation between the input box and the input method interface, in comparison with the existing technical solution in which it is estimated whether the position of a cursor in the input box at the current position reaches one-third of the screen of the hand-held terminal device or is at another position on the screen, and the browsed web page or canvas is moved upward by a distance calculated based on the estimated position of the cursor, to relocate the input box to a reasonable target position.

There exist various modes for determining the popup position of the input method interface and adjusting the position relation between the input box and the input method interface, which will be illustrated in detail below in embodiments.

FIGS. 1-5 show the first embodiment of the invention.

Figure 2:
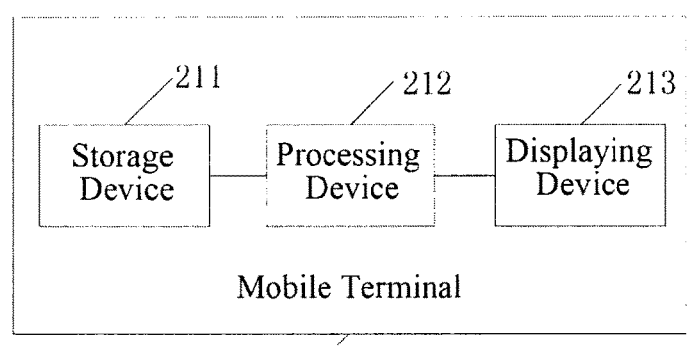
FIG. 2 is a schematic diagram showing an applicable environment for embodying the method for relocating an input box to a target position in a mobile terminal browser according to an embodiment of the invention.

FIG. 1 is a schematic flow chart of a method for relocating an input box to a target position in a mobile terminal browser according to the first embodiment of the invention. By the method according to this embodiment, the designating of the target position of the input box in a browser may be realized in a mobile terminal. The device for relocating an input box to a target position in a mobile terminal browser may be configured in the mobile terminal. As shown in FIG. 2, a mobile terminal 21 may include a storage device 211, a processing device 212 and a displaying device 213. A software program for performing the method is stored in the storage device 211 and may be executed by the processing device 212; and the displaying device 213 provides an interface for displaying an input box, an input method interface and the contents of the browsed web page.

Referring to FIG. 1, the method includes Steps S101-S103 below.

At Step S101, when an input box in a web page as browsed on the screen of the displaying device 213 is clicked and an input method interface pops up from the bottom of the mobile terminal screen, the processing device 212 calculates the position of the input box relative to the input method interface and determines whether the input box is partially or completely covered by the input method interface.

Figure 3:
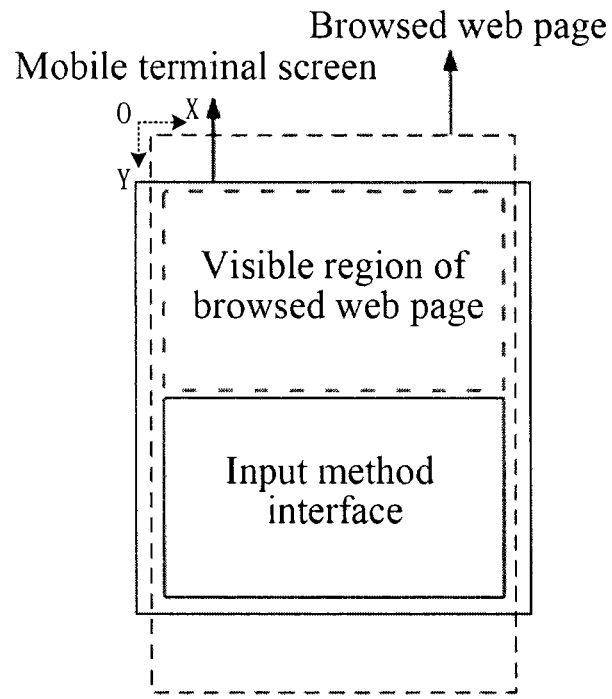
FIG. 3 is a schematic diagram showing the positions of an input method interface, a mobile terminal screen, a web page as browsed and a visible region for the browsed web page, which are applicable to the first embodiment of the invention.

This embodiment is illustrated by an example where the input box is under the input method interface (as shown in FIG. 3).

In this step, the processing device 212 determines whether the input box is partially or completely covered by the input method interface by determining whether the lower edge position of the input box is below the upper edge position of the input method interface. If the lower edge position of the input box is below the upper edge position of the input method interface, it is determined that the input box is partially or completely covered by the input method interface.

FIG. 3 is a schematic diagram showing the positions of a mobile terminal screen, an input method interface, a web page as browsed and a visible region of the browsed web page, to which the first embodiment of the invention is applicable. Referring to FIG. 3, the browsed web page refers to a current real web page that is currently browsed by the user, and the height of the browsed web page is larger than or equal to the height of the mobile terminal screen. If the height of the browsed web page after being typeset is larger than the height of the mobile terminal screen, the browsed web page may be scrolled up and down, that is, scrolled internally. The visible region of the browsed web page refers to a region above the input method interface on the mobile terminal screen.

In a preferred implementation of this embodiment, when an input box in the browsed web page is clicked and an input method interface pops up from the bottom of the mobile terminal screen, the processing device 212 obtains coordinates of the top-left corner, the width and the height of the visible region of the browsed web page by calling a system function getWindowVisibleDisplayFrame in a browser control such as androidwebview, and calculate the upper edge position of the input method interface, i.e., the sum of the Y-coordinate of the top-left corner of the visible region of the browsed web page and the height of the visible region.

In this embodiment, the origin of the coordinate system is located at the top-left corner of the browsed web page. The coordinates of the top-left corner of the visible region of the browsed web page include an X-coordinate and a Y-coordinate. The X-coordinate represents a distance between the top-left corner of the visible region of the browsed web page and the top-left corner of the browsed web page in the horizontal direction, and the Y-coordinate represents a distance between the top-left corner of the visible region and the top-left corner of the browsed web page in the vertical direction.

In this embodiment, the lower edge position of the input box mentioned above refers to a vertical distance from the top-left corner of the browsed web page (i.e. the origin of the coordinate system) to the lower edge of the input box.

When the processing device 212 determines that the lower edge position of the input box is farther from the origin than the upper edge position of the input method interface, that is, the lower edge position of the input box is below the upper edge position of the input method interface, it is determined that the input box is partially or completely covered by the input method interface.

However, it can be understood by one of ordinary skills in the art that, the origin of the coordinate system applying to the lower edge position of the input box and the upper edge position of the input method interface in this embodiment is not limited to the top-left corner of the browsed web page, and instead may be the bottom-left corner of the browsed web page, for example, in this case, if the processing device 212 determines that the lower edge position of the input box is closer to the origin than the upper edge position of the input method interface, i.e., the lower edge position of the input box is below the upper edge position of the input method interface, it is determined that the input box is partially or completely covered by the input method interface.

At Step S102, when the input box is partially or completely covered by the input method interface, the processing device 212 designates the target position of the input box according to the upper edge position of the input method interface.

In this step, when the input box is partially or completely covered by the input method interface, the processing device 212 needs to relocate the input box to a designated target position which is above the input method interface, so that the input box is completely visible to the user. In a preferred implementation of this embodiment, the target position of the input box is such that the lower edge position of the input box coincides with the upper edge position of the input method interface.

At Step S103, the processing device 212 renders the input box at the target position by scrolling the browsed web page and/or canvas. Wherein, the browsed canvas refers to the visible region displayed on the mobile terminal screen, and may be scrolled up and down. The rendering of the input box means displaying the input box on the screen of the displaying device 213 in the form of an image.

Figure 4:
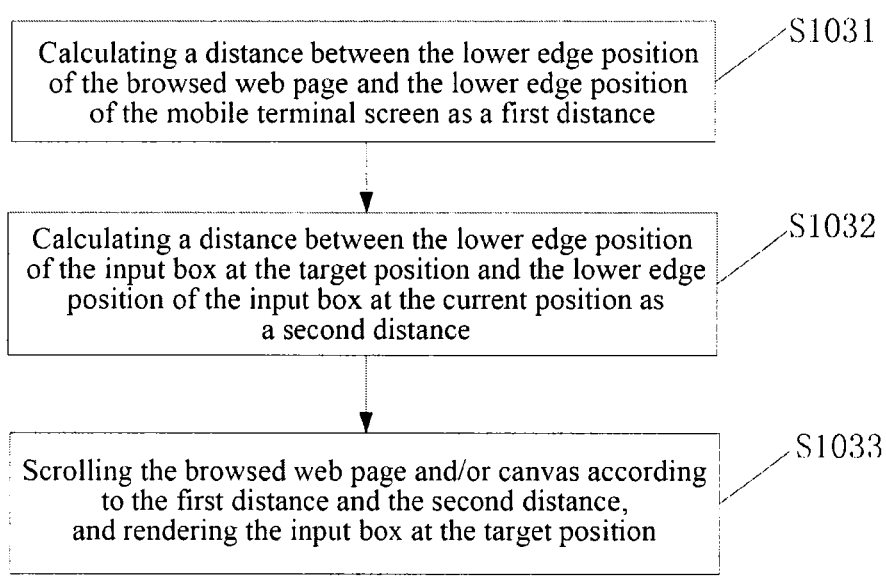
FIG. 4 is a schematic flow chart of rendering the input box at the target position by scrolling the web page and/or canvas as browsed according to a second embodiment of the invention.

FIG. 4 is a schematic flow chart of rendering the input box at the target position by scrolling the browsed web page and/or canvas according to the second embodiment of the invention, which is based on the first embodiment. Referring to FIG. 4, Step S103 of FIG. 1 further includes the following sub-steps S1031-S1033.

At sub-step S1031, the processing device 212 calculates a distance between the lower edge position of the browsed web page and the lower edge position of the mobile terminal screen as a first distance.

At sub-step S1032, the processing device 212 calculates a distance between the lower edge position of the input box at the target position and the lower edge position of the input box at the current position as a second distance.

At sub-step S1033, the processing device 212 scrolls the browsed web page and/or canvas according to the first distance and the second distance, and renders the input box at the target position on the screen of the displaying device 213.

In this embodiment, FIGS. 5a and 5b are schematic diagrams showing the calculating of the first distance and the second distance according to the second embodiment of the invention. Here, FIG. 5a shows the first distance X1, and FIG. 5b shows the second distance X2.

In a preferred implementation of this embodiment, scrolling the browsed web page and/or canvas by the processing device 212 according to the first distance and the second distance includes that:

when the first distance is 0, i.e., when the lower edge position of the browsed web page coincides with the lower edge position of the mobile terminal screen, the processing device 212 scrolls the browsed canvas upward by the second distance so that the input box is relocated at the target position;

when the first distance is larger than or equal to the second distance, the processing device 212 scrolls the browsed web page upward by the second distance so that the input box is relocated at the target position; and when the first distance is less than the second distance, the processing device 212 calculates the difference between the second distance and the first distance as a third distance, scrolls the browsed web page upward by the first distance, and then scrolls the browsed canvas upward by the third distance, so that the input box is relocated at the target position.

In the above technical solution, the browsed web page and/or canvas are scrolled depending upon the position of the browsed web page relative to the mobile terminal screen. When the browsed web page extends beyond the bottom of the mobile terminal screen by a distance larger than the distance by which the input box is displaced, only the browsed web page is scrolled so that the following part of the browsed web page may be displayed, and a blank region will not be present when the soft keyboard is displayed or disappears. When the browsed web page extends beyond the mobile terminal screen by a distance less than the distance by which the input box is displaced, the browsed web page is scrolled and subsequently the browsed canvas is scrolled, so that the following part of the browsed web page may be displayed.

Figure 7:
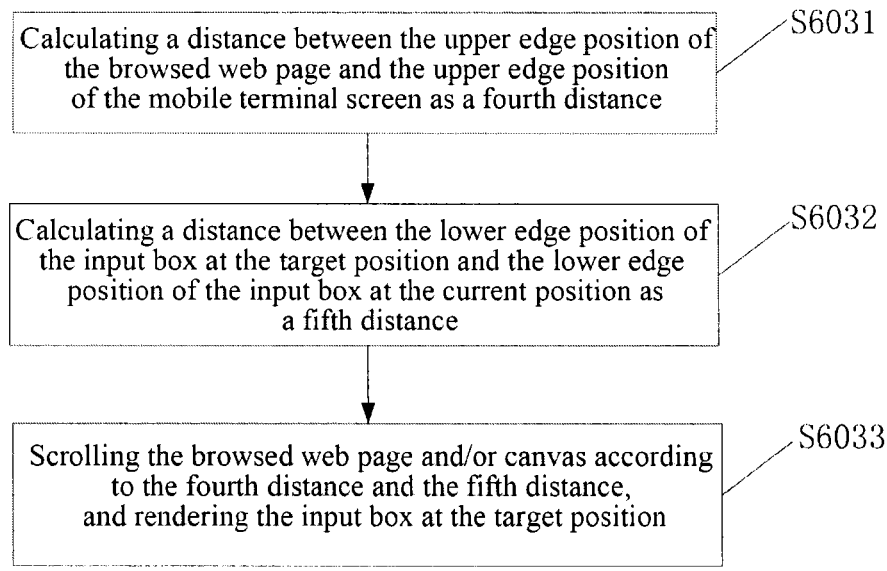
FIG. 7 is a schematic flow chart of rendering the input box at the target position by scrolling the web page and/or canvas as browsed according to a fourth embodiment of the invention.

FIGS. 6-7 show the third embodiment of the invention, where the implementation of the method for relocating an input box to a target position is illustrated in an example where the input box lies above the input method interface.

As shown in FIG. 6, the relocating of the input box to the target position in a browser may be implemented in a mobile terminal. The mobile terminal is the same as that in the first embodiment, and will not be described again here.

Referring to FIG. 6, the method includes Steps S601-603 below.

At Step S601, when an input box in a browsed web page on the screen of the displaying device 213 is clicked and an input method interface pops up from the top of the mobile terminal screen, the processing device 212 calculates the position of the input box relative to the input method interface and determines whether the input box is partially or completely covered by the input method interface.

In this step, the processing device 212 determines whether the input box is partially or completely covered by the input method interface by determining whether the upper edge position of the input box is above the lower edge position of the input method interface. If the upper edge position of the input box is above the lower edge position of the input method interface, it is determined that the input box is partially or completely covered by the input method interface.

In a preferred implementation of this embodiment, when an input box in the browsed web page is clicked and an input method interface pops up from the top of the mobile terminal screen, the processing device 212 obtain coordinates of the top-left corner of the visible region of the browsed web page by calling a system function getWindowVisibleDisplayFrame in a browser control androidwebview, and obtains the lower edge position of the input method interface. Herein, the visible region of the browsed web page is a region below the input method interface displayed on the mobile terminal screen.

At Step S602, when the input box is partially or completely covered by the input method interface, the processing device 212 designates the target position of the input box according to the lower edge position of the input method interface.

In this step, when the input box is partially or completely covered by the input method interface, the processing device 212 needs to relocate the input box to the target position which is below the input method interface, so that the input box is completely visible to the user. In a preferred implementation of this embodiment, the target position of the input box is such that the upper edge position of the input box coincides with the lower edge position of the input method interface.

At Step S603, the processing device 212 renders the input box at the target position by scrolling the browsed web page and/or canvas.

FIG. 7 is a schematic flow chart of rendering the input box at the target position by scrolling the browsed web page and/or canvas according to the fourth embodiment of the invention, which is based on the third embodiment. Referring to FIG. 7, the Step S603 of FIG. 6 further includes the following sub-steps S6031-6033 below.

At sub-step S6031, the processing device 212 calculates a distance between the upper edge position of the browsed web page and the upper edge position of the mobile terminal screen as a fourth distance, At sub-step S6032, the processing device 212 calculates a distance between the lower edge position of the input box at the target position and the lower edge position of the input box at the current position as a fifth distance.

At sub-step S6033, the processing device 212 scrolls the browsed web page and/or canvas according to the fourth distance and the fifth distance, and renders the input box at the target position on the screen of the displaying device 213. Rendering of the input box refers to displaying the input box on the screen of the displaying device 213 in the form of an image.

In a preferred implementation of this embodiment, scrolling the browsed web page and/or canvas by the processing device 212 according to the fourth distance and the fifth distance includes that:

when the fourth distance is 0, i.e., when the upper edge position of the browsed web page coincides with the upper edge position of the mobile terminal screen, the processing device 212 scrolls the browsed canvas downward by the fifth distance so that the input box is relocated at the target position;

when the fourth distance is larger than or equal to the fifth distance, the processing device 212 scrolls the browsed web page by the fifth distance so that the input box is relocated at the target position; and when the fourth distance is less than the fifth distance, the processing device 212 calculates the difference between the fifth distance and the fourth distance as a six distance, scrolls the browsed web page downward by the fourth distance, and then scrolls the browsed canvas downward by the six distance, so that the input box is relocated at the target position.

In the technical solution of this embodiment, the displaying of the web page on the screen can be further optimized considering the position of the browsed web page relative to the screen in conjunction with scrolling the browsed web page and canvas, just like in the above embodiments.

An embodiment of the invention further provides a device for relocating an input box to a target position in a mobile terminal browser, and the device includes a determining module, a locating module and a rendering module. The determining module is adapted to, when an input box in a browsed web page is clicked and an input method interface pops up, calculate the position of the input box relative to the input method interface and determine whether the input box is partially or completely covered by the input method interface; the locating module is adapted to designate a target position of the input box according to the position of the input method interface, when the input box is partially or completely covered by the input method interface; and the rendering module is adapted to render the input box at the target position by scrolling the browsed web page and/or canvas.

There exist various modes for calculating the popup position of the input method interface on the screen and the relative position relation between the input box and the input method interface, and detailed introduction of this will be given below by embodiments.

Figure 8:
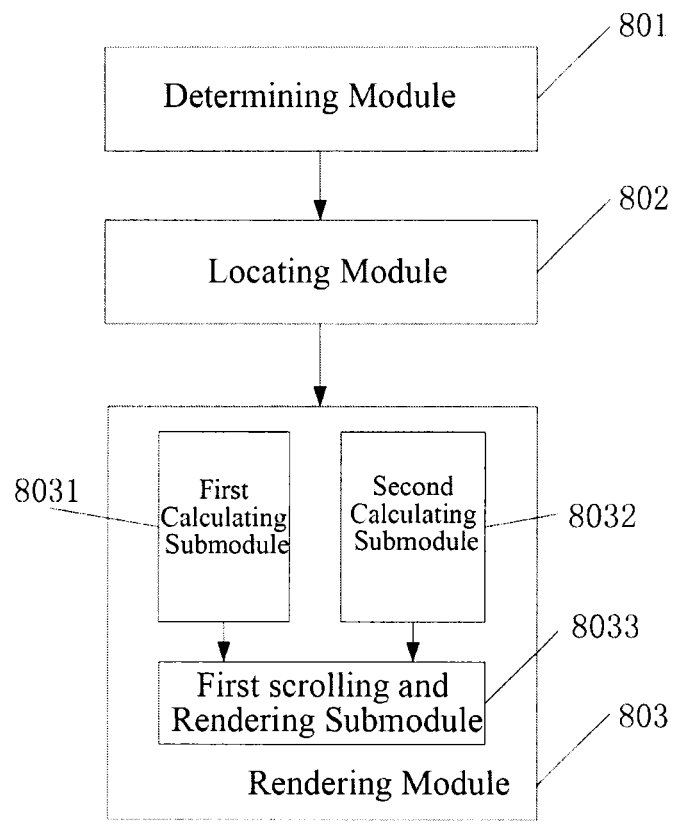
FIG. 8 is a schematic diagram of a device for relocating an input box to a target position in a mobile terminal browser according to a fifth embodiment of the invention.

FIG. 8 shows the fifth embodiment of the invention.

FIG. 8 is a schematic diagram of a device for relocating an input box to a target position in a mobile terminal browser according to the fifth embodiment of the invention. Referring to FIG. 8, the device for relocating an input box to a target position includes a determining module 801, a locating module 802 and a rendering module 803. The determining module 801 is adapted to, when a user clicks the input box in a browsed web page and an input method interface pops up from the bottom of the mobile terminal screen, calculate the position of the input box relative to the input method interface and determine whether the input box is partially or completely covered by the input method interface; the locating module 802 is adapted to designate a target position of the input box according to the upper edge position of the input method interface, when the input box is partially or completely covered by the input method interface; and the rendering module 803 is adapted to render the input box at the target position by scrolling the browsed web page and/or canvas.

In this embodiment, the determining module 801 may specifically determine whether the input box is partially or completely covered by the input method interface by determining whether the lower edge position of the input box in the browsed web page is below the upper edge position of the input method interface when the input box is clicked and the input method interface pops up from the bottom of the mobile terminal screen. If the lower edge position of the input box is below the upper edge position of the input method interface, it is determined that the input box is partially or completely covered by the input method interface.

When the input method interface pops up from the bottom of the screen, the determining module 801 may obtain coordinates of the top-left corner, the width and the height of the visible region of the browsed web page by calling a system function getWindowVisibleDisplayFrame in a browser control androidwebview, and calculates the upper edge position of the input method interface as the sum of the Y-coordinate of the top-left corner of the visible region and the height of the visible region. Herein, the visible region of the browsed web page refers to a region above the input method interface displayed on the mobile terminal screen.

In this embodiment, the lower edge position of the input box mentioned above refers to a vertical distance from the top-left corner of the browsed web page (i.e. the origin of the coordinate system) to the lower edge of the input box.

When the determining module 801 determines that the lower edge position of the input box is farther from the origin than the upper edge position of the input method interface, that is, the lower edge position of the input box is below the upper edge position of the input method interface, it is determined that the input box is partially or completely covered by the input method interface.

However, it can be understood by one of ordinary skills in the art that, the origin of the coordinate system applying to the lower edge position of the input box and the upper edge position of the input method interface in this embodiment is not limited to the top-left corner of the browsed web page, and instead may be the bottom-left corner of the browsed web page, for example, in this case, if the determining module 801 determines that the lower edge position of the input box is closer to the origin than the upper edge position of the input method interface, i.e., the lower edge position of the input box is below the upper edge position of the input method interface, it is determined that the input box is partially or completely covered by the input method interface.

In this embodiment, when the input box is partially or completely covered by the input method interface, the locating module 802 needs to relocate the input box to the target position which is above the input method interface, so that the input box is completely visible to the user. In a preferred implementation of this embodiment, for the case that the input method interface pops up from the bottom of the screen, the target position of the input box is such that the lower edge position of the input box coincides with the upper edge position of the input method interface.

In this embodiment, the rendering module 803 further includes:

a first calculating submodule 8031, which is used for calculating a distance between the lower edge position of the browsed web page and the lower edge position of the mobile terminal screen as a first distance;

a second calculating submodule 8032, which is used for calculating a distance between the lower edge position of the input box at the target position and the lower edge position of the input box at the current position as a second distance; and a first scrolling and rendering submodule 8033, which is used for scrolling the browsed web page and/or canvas according to the first distance and the second distance, and rendering the input box at the target position.

In a preferred implementation of this embodiment, scrolling the browsed web page and/or canvas by the first scrolling and rendering submodule 8033 according to the first distance and the second distance includes:

scrolling the browsed canvas upward by the second distance when the first distance is 0, i.e., when the lower edge position of the browsed web page coincides with the lower edge position of the mobile terminal screen, so that the input box is relocated at the target position;

scrolling the browsed web page upward by the second distance when the first distance is larger than or equal to the second distance, so that the input box is relocated at the target position; and calculating a difference between the second distance and the first distance as a third distance when the first distance is less than the second distance, scrolling the browsed web page upward by the first distance, and then scrolling the browsed canvas upward by the third distance, so that the input box is relocated at the target position.

Figure 9:
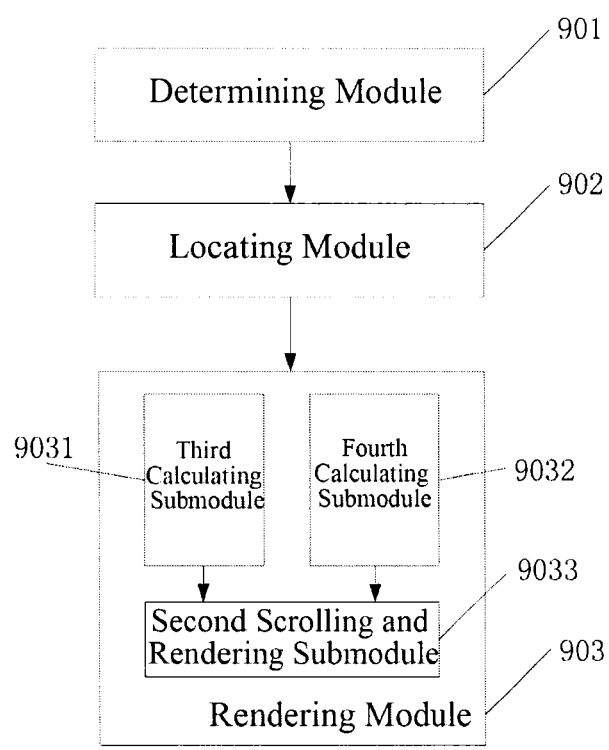
FIG. 9 is a schematic diagram of a device for relocating an input box to a target position in a mobile terminal browser according to a six embodiment of the invention.

FIG. 9 shows the six embodiment of the invention.

FIG. 9 is a schematic diagram of a device for relocating an input box to a target position in a mobile terminal browser according to the six embodiment of the invention. Referring to FIG. 9, the device for relocating an input box to a target position includes a determining module 901, a locating module 902 and a rendering module 903. The determining module 901 is adapted to, when a user clicks an input box in a browsed web page and an input method interface pops up from the top of the mobile terminal screen, calculate the position of the input box relative to the input method interface and determine whether the input box is partially or completely covered by the input method interface; the locating module 902 is adapted to determine the target position of the input box according to the lower edge position of the input method interface when the input box is partially or completely covered by the input method interface; and the rendering module 903 is adapted to render the input box at the target position by scrolling the browsed web page and/or canvas.

In this embodiment, the determining module 901 determines whether the input box in the browsed web page is partially or completely covered by the input method interface by determining whether the upper edge position of the input box is above the lower edge position of the input method interface when the input box is clicked and the input method interface pops up from the top of the mobile terminal screen. If the upper edge position of the input box is above the lower edge position of the input method interface, it is determined that the input box is partially or completely covered by the input method interface.

When the input method interface pops up, the determining module 901 obtains coordinates of the top-left corner of the visible region of the browsed web page by calling a system function getWindowVisibleDisplayFrame in a browser control androidwebview, and obtains the upper edge position of the input method interface. Herein, the visible region of the browsed web page refers to a region below the input method interface displayed on the mobile terminal screen.

In this embodiment, when the input box is partially or completely covered by the input method interface, the locating module 902 needs to relocate the input box to the target position which is below the input method interface, so that the input box may be completely visible to the user. In a preferred implementation of this embodiment, the target position of the input box is such that the upper edge position of the input box coincides with the lower edge position of the input method interface.

In this embodiment, the rendering module 903 further includes:

a third calculating submodule 9031, which is used for calculating a distance between the upper edge position of the browsed web page and the upper edge position of the mobile terminal screen as a fourth distance;

a fourth calculating submodule 9032, which is used for calculating a distance between the lower edge position of the input box at the target position and the lower edge position of the input box at the current position as a fifth distance; and a second scrolling and rendering submodule 9033, which is used for scrolling the browsed web page and/or canvas according to the fourth distance and the fifth distance, and rendering the input box at the target position.

In a preferred implementation of this embodiment, scrolling the browsed web page and/or canvas by the second scrolling and rendering submodule 9033 according to the fourth distance and the fifth distance includes:

scrolling the browsed canvas downward by the fifth distance so that the input box is relocated at the target position, when the fourth distance is 0, i.e., when the upper edge position of the browsed web page coincides with the upper edge position of the mobile terminal screen;

scrolling the browsed web page by the fifth distance so that the input box is relocated at the target position, when the fourth distance is larger than or equal to the fifth distance; and calculating a difference between the fifth distance and the fourth distance as a six distance when the fourth distance is less than the fifth distance, scrolling the browsed web page downward by the fourth distance, and then scrolling the browsed canvas downward by the six distance, so that the input box is relocated at the target position.

In the technical solution according to this embodiment of the invention, when the input box is partially or completely covered by the input method interface, the browsed web page and/or canvas is scrolled, so that the input box is finally rendered at a reasonable target position for display and is completely visible to the user, to avoid the case that, when the input method interface pops up from the bottom of a mobile terminal screen, a blank region will sometimes appear under the target position of the input box. Moreover, the user will not be disturbed from viewing a verification code above the input box.

However, it should be understood by one of ordinary skills in the art that, when an input box in a browsed web page is clicked and an input method interface pops up from a position other than the bottom or top of the mobile terminal screen (for example, from the left side or the right side of the mobile terminal screen), the method and the device for relocating the input box to the target position are similar to those put forward in the above embodiments of the invention, and will not be described again here.

A part or all of the technical solutions provided in the above embodiments may be implemented via a software program, which may be stored in a computer-readable storage medium, for example, a hard disk, a Read-Only Memory (ROM), a Compact Disk or a floppy disk.

An embodiment of the invention further provides a storage medium containing computer-executable instructions, which, when executed by a computer processor, perform a method for relocating an input box to a target position in a mobile terminal browser, and the method includes:

calculating, when an input box in a browsed web page is clicked and an input method interface pops up, a position of the input box relative to the input method interface and determining whether the input box is partially or completely covered by the input method interface;

designating a target position of the input box according to the position of the input method interface, when the input box is partially or completely covered by the input method interface; and rendering the input box at the target position by scrolling the browsed web page and/or canvas.

The above executable instructions stored in the storage medium may be further adapted to perform the method for relocating an input box to a target position in a mobile terminal browser according to any embodiment of the invention.

In light of the above description of the embodiments, one skilled in the art may clearly understand that the invention may be implemented by software and necessary universal hardware, or by hardware merely. However, in many cases, the former is preferred. Based on this understanding, the technical solution of the present invention is substantially embodied in a manner of software product or a part of the technical solution contributed to the prior art is embodied in a manner of software product, and the computer software can be stored in the storage medium, where the storage medium can be floppy disk, Read-only Memory, Random Access Memory, Flash, hard disk, optical disk and the like9, several instructions included in the software are used to enable the computer device (such as the personal computer, the server or the network device) to execute the method of several embodiment of the present invention.

The above description only shows some preferred embodiments of the invention, rather than limiting the scope thereof. All modifications, equivalent substitutions and improvements made without departing from the concept and principles of the invention should fall within the protection scope of the invention.

What is claimed is:

1. A method for relocating an input box to a target position in a mobile terminal browser, comprising:

calculating, when an input box in a browsed web page is clicked and an input method interface pops up, a position of the input box relative to the input method interface and determining whether the input box is partially or completely covered by the input method interface;

designating a target position of the input box according to a position of the input method interface, when the input box is partially or completely covered by the input method interface; and rendering the input box at the target position by scrolling one or more content display containers, wherein a first content display container is the browsed web page, and a second content display container is a browsed canvas, the browsed canvas being a visible region displayed on the mobile terminal screen that renders the browsed web page, wherein each content display container is maintained with respective corresponding coordinates, and the browsed web page and the browsed canvas are both scrollable based on the respective corresponding coordinates;

wherein rendering the input box at the target position further comprises:

calculating a distance between a lower edge position of the browsed web page and a lower edge position of a mobile terminal screen as a first distance;

calculating a distance between a lower edge position of the input box at the target position and the lower edge position of the input box at the current position as a second distance;

determining, between the browsed web page and the browsed canvas, which content display container to be scrolled and a corresponding scrolling distance based on the first distance, the second distance, and the respective corresponding coordinates, including:

determining whether the first distance equals to zero;

in response to determining that the first distance is 0, automatically scrolling only the second content display container upward by the second distance;

determining whether the first distance is less than the second distance;

in response to determining that the first distance is larger than or equal to the second distance, automatically scrolling only the first content display container upward by the second distance; and in response to determining that the first distance is less than the second distance, calculating a difference between the second distance and the first distance as a third distance; automatically scrolling both the first content display container and the second content display container upward, wherein the browsed webpage is scrolled upward by the first distance, and the browsed canvas is scrolled upward by the third distance.

2. The method of claim 1, wherein, calculating, when an input box in a browsed web page is clicked and an input method interface pops up, the position of the input box relative to the input method interface and determining whether the input box is partially or completely covered by the input method interface comprises:

determining whether the lower edge position of the input box is below an upper edge position of the input method interface, when the input box is clicked and the input method interface pops up from the bottom of a mobile terminal screen; and if the lower edge position of the input box is below the upper edge position of the input method interface, determining that the input box is partially or completely covered by the input method interface.

3. The method of claim 2, wherein, when the input box is partially or completely covered by the input method interface, designating the target position of the input box according to the position of the input method interface comprises:

designating the target position of the input box in such a way that the lower edge position of the input box coincides with the upper edge position of the input method interface, when the input box is partially or completely covered by the input method interface.

4. The method of claim 1, wherein, calculating, when an input box in a browsed web page is clicked and an input method interface pops up, a position of the input box relative to the input method interface and determining whether the input box is partially or completely covered by the input method interface, comprises:

determining whether the upper edge position of the input box is above the lower edge position of the input method interface when the input box is clicked and the input method interface pops up from the top of the mobile terminal screen; and if so, determining that the input box is partially or completely covered by the input method interface.

5. The method of claim 4, wherein, designating the target position of the input box according to the position of the input method interface when the input box is partially or completely covered by the input method interface, comprises:

designating the target position of the input box in such a way that the upper edge position of the input box coincides with the lower edge position of the input method interface, when the input box is partially or completely covered by the input method interface.

6. The method of claim 4, wherein, rendering the input box at the target position comprises:

calculating a distance between the upper edge position of the browsed web page and the upper edge position of the mobile terminal screen as a fourth distance;

calculating a distance between the lower edge position of the input box at the target position and the lower edge position of the input box at the current position as a fifth distance; and rendering the input box at the target position by scrolling at least one of the browsed web page or the browsed canvas according to the fourth distance and the fifth distance.

7. The method of claim 6, wherein, rendering the input box at the target position according to the fourth distance and the fifth distance comprises:
   scrolling the browsed canvas downward by the fifth distance when the fourth distance is 0, so that the input box is relocated at the target position;
   scrolling the browsed web page downward by the fifth distance when the fourth distance is larger than or equal to the fifth distance, so that the input box is relocated at the target position; and
   calculating a difference between the fifth distance and the fourth distance as a sixth distance when the fourth distance is less than the fifth distance, scrolling the browsed web page downward by the fourth distance, and then scrolling the browsed canvas downward by the sixth distance, so that the input box is relocated at the target position.

8. A device for relocating an input box to a target position in a mobile terminal browser, comprising:
   a memory; and
   a processor coupled to the memory;
   wherein the processor is configured for:
   calculating, when an input box in a browsed web page is clicked and an input method interface pops up, a position of the input box relative to the input method interface and determining whether the input box is partially or completely covered by the input method interface;
   designating a target position of the input box according to a position of the input method interface, when the input box is partially or completely covered by the input method interface; and
   rendering the input box at the target position by scrolling one or more content display containers, wherein a first content display container is the browsed web page, and a second content display container is a browsed canvas, the browsed canvas being a visible region displayed on the mobile terminal screen that renders the browsed web page, wherein each content display container is maintained with respective corresponding coordinates, and the browsed web page and the browsed canvas are both scrollable based on the respective corresponding coordinates;
   wherein the processor is further configured for:
      calculating a distance between a lower edge position of the browsed web page and a lower edge position of a mobile terminal screen as a first distance;
      calculating a distance between a lower edge position of the input box at the target position and the lower edge position of the input box at the current position as a second distance;
      determining, between the browsed web page and the browsed canvas, which content display container to be scrolled and a corresponding scrolling distance based on the first distance, the second distance, and the respective corresponding coordinates, including:
         determining whether the first distance equals to zero;
         in response to determining that the first distance is 0, automatically scrolling only the second content display container upward by the second distance;
         determining whether the first distance is less than the second distance;
         in response to determining that the first distance is larger than or equal to the second distance, automatically scrolling only the first content display container upward by the second distance; and
         in response to determining that the first distance is less than the second distance, calculating a difference between the second distance and the first distance as a third distance; automatically scrolling both the first content display container and the second content display container upward, wherein the first content display container is scrolled upward by the first distance, and the second content display container is scrolled upward by the third distance.

9. The device of claim 7, wherein, the processor is adapted to:
   determine whether the lower edge position of the input box is below the upper edge position of the input method interface, when the input box is clicked and the input method interface pops up from the bottom of a mobile terminal screen; and if so, determine that the input box is partially or completely covered by the input method interface.

10. The device of claim 9, wherein, the processor is adapted to:
    designate the target position of the input box in such a way that the lower edge position of the input box coincides with the upper edge position of the input method interface, when the input box is partially or completely covered by the input method interface.

11. The device of claim 8, wherein, the processor is adapted to:
    determine whether the upper edge position of the input box is above the lower edge position of the input method interface, when the input box is clicked and the input method interface pops up from the top of the mobile terminal screen; and if so, determine that the input box is partially or completely covered by the input method interface.

12. The device of claim 11, wherein, the processor is adapted to:
    designate the target position of the input box in such a way that the upper edge position of the input box coincides with the lower edge position of the input method interface, when the input box is partially or completely covered by the input method interface.

13. The device of claim 11, wherein, the processor is further configured for:
    calculating a distance between the upper edge position of the browsed web page and the upper edge position of the mobile terminal screen as a fourth distance;
    calculating a distance between the lower edge position of the input box at the target position and the lower edge position of the input box at the current position as a fifth distance; and
    rendering the input box at the target position by scrolling the browsed web page and/or canvas according to the fourth distance and the fifth distance.

14. A non-transitory storage medium containing computer-executable instructions, which, when executed by a computer processor, perform a method for relocating an input box to a target position in a mobile terminal browser, wherein the method comprises:
    calculating, when an input box in a browsed web page is clicked and an input method interface pops up, a position of the input box relative to the input method interface and determining whether the input box is partially or completely covered by the input method interface;

designating a target position of the input box according to a position of the input method interface, when the input box is partially or completely covered by the input method interface; and rendering the input box at the target position by scrolling one or more content display containers, wherein a first content display container is the browsed web page, and a second content display container is a browsed canvas, the browsed canvas being a visible region displayed on the mobile terminal screen that renders the browsed web page, wherein each content display container is maintained with respective corresponding coordinates, and the browsed web page and the browsed canvas are both scrollable based on the respective corresponding coordinates;

wherein rendering the input box at the target position further comprises:
   calculating a distance between a lower edge position of the browsed web page and a lower edge position of a mobile terminal screen as a first distance;
   calculating a distance between a lower edge position of the input box at the target position and the lower edge position of the input box at the current position as a second distance;
   determining, between the browsed web page and the browsed canvas, which content display container to be scrolled and a corresponding scrolling distance based on the first distance, the second distance, and the respective corresponding coordinates, including:
      determining whether the first distance equals to zero;
      in response to determining that the first distance is 0, automatically scrolling only the second content display container upward by the second distance;
      determining whether the first distance is less than the second distance;
      in response to determining that the first distance is larger than or equal to the second distance, automatically scrolling only the first content display container upward by the second distance; and
      in response to determining that the first distance is less than the second distance, calculating a difference between the second distance and the first distance as a third distance; automatically scrolling both the first content display container and the second content display container upward, wherein the browsed webpage is scrolled upward by the first distance, and the second content display container is scrolled upward by the third distance.

15. The method of claim 1, wherein calculating the position of the input box relative to the input method interface further comprises:
   obtaining coordinates of a corner of a visible region of the browsed web page by calling a system function in a browser control; and
   obtaining the lower edge position of the input method interface.

* * * * *